United States Patent
Madonna et al.

(10) Patent No.: US 12,316,473 B2
(45) Date of Patent: *May 27, 2025

(54) MULTI-ROLE DEVICES FOR AUTOMATION ENVIRONMENTS

(71) Applicant: Savant Systems, Inc., Hyannis, MA (US)

(72) Inventors: Robert P. Madonna, Osterville, MA (US); Arthur A. Jacobson, Long Lake, MN (US); David W. Tatzel, West Yarmouth, MA (US); Victor Rendina, Cambridge, MA (US); Timothy R. Locascio, Osterville, MA (US)

(73) Assignee: Savant Systems, Inc., Hyannis, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,261

(22) Filed: Nov. 20, 2023

(65) Prior Publication Data

US 2024/0089141 A1 Mar. 14, 2024

Related U.S. Application Data

(63) Continuation of application No. 16/790,133, filed on Feb. 13, 2020, now Pat. No. 11,863,343.

(60) Provisional application No. 62/805,456, filed on Feb. 14, 2019.

(51) Int. Cl.
*H04L 12/28* (2006.01)
*H04L 67/125* (2022.01)

(52) U.S. Cl.
CPC .......... *H04L 12/283* (2013.01); *H04L 67/125* (2013.01); *H04L 2012/2849* (2013.01)

(58) Field of Classification Search
CPC .......... H04L 12/283; H04L 2012/2849; H04L 67/125
USPC ........................................................ 709/230
See application file for complete search history.

(56) References Cited

U.S. PATENT DOCUMENTS

| 7,480,753 B2 * | 1/2009 | Bohm ................. G06F 13/4022 710/313 |
| 7,930,644 B2 | 4/2011 | Silva et al. |
| 8,213,463 B2 | 7/2012 | Noonan et al. |
| 8,296,669 B2 | 10/2012 | Madonna et al. |

(Continued)

FOREIGN PATENT DOCUMENTS

| CN | 101277362 A | 10/2008 |
| CN | 102413374 A | 4/2012 |

(Continued)

OTHER PUBLICATIONS

"Chinese Search Report for Chinese Application No. 202080028521.1", dated Jan. 28, 2024, pp. 1-5.

(Continued)

*Primary Examiner* — David P Zarka
(74) *Attorney, Agent, or Firm* — Cesari and McKenna, LLP; Michael E. Attaya

(57) ABSTRACT

In accordance with one aspect of the invention, an automation control device, such as a host or hub, is provided with functionality so that it becomes a multi-role automation control device. One such multi-role automation control device produces an on screen display which enables a user to select predetermined lighting scenes or television channels, and to control other devices.

2 Claims, 14 Drawing Sheets

(56) References Cited

U.S. PATENT DOCUMENTS

| | | | |
|---|---|---|---|
| 8,526,929 B1 | 9/2013 | Gilbert et al. | |
| 8,659,704 B2 | 2/2014 | Madonna et al. | |
| 9,153,125 B2* | 10/2015 | Madonna | G08C 17/02 |
| 9,442,474 B2* | 9/2016 | Madonna | H04N 21/42222 |
| 9,513,615 B2 | 12/2016 | Madonna et al. | |
| 10,613,704 B2 | 4/2020 | Madonna et al. | |
| 11,622,179 B2 | 4/2023 | Christie | |
| 11,863,343 B2* | 1/2024 | Madonna | H04L 67/125 |
| 2007/0192807 A1* | 8/2007 | Howcroft | H04N 21/8586 348/E7.071 |
| 2008/0005262 A1* | 1/2008 | Wurzburg | G06F 13/4022 709/217 |
| 2008/0309828 A1* | 12/2008 | Narita | H04N 21/4622 348/731 |
| 2013/0249715 A1 | 9/2013 | Shih et al. | |
| 2013/0261821 A1 | 10/2013 | Lu et al. | |
| 2016/0135241 A1 | 5/2016 | Gujral et al. | |
| 2016/0139574 A1* | 5/2016 | Lee | H04L 12/2836 700/275 |
| 2017/0070775 A1 | 3/2017 | Taxier et al. | |
| 2017/0099157 A1 | 4/2017 | Jacobson et al. | |
| 2018/0102916 A1 | 4/2018 | Chen et al. | |
| 2018/0136900 A1* | 5/2018 | Maling, III | G06F 3/165 |
| 2019/0004677 A1* | 1/2019 | Madonna | G06F 3/04845 |
| 2019/0230424 A1 | 7/2019 | Christie | |
| 2020/0267013 A1 | 8/2020 | Madonna et al. | |

FOREIGN PATENT DOCUMENTS

| | | |
|---|---|---|
| CN | 106155009 A | 11/2016 |
| JP | 2002-152280 A | 5/2002 |
| JP | 2009-523272 A | 6/2009 |
| WO | WO-2012/039769 A1 | 3/2012 |

OTHER PUBLICATIONS

International Search Report and Written Opinion mailed May 11, 2020 for PCT Application No. PCT/US2020/018222 filed Feb. 14, 2020 for Savant Systems, LLC, 17 pages.

"Microsoft Computer Dictionary 72, 260" Microsoft Press, Microsoft Corporation, (5$^{th}$ ed. 2002), p. 72 & p. 260, 2002, 4 pages.

"Chinese Office Action," Chinese Patent Office, CNIPA, Chinese Application No. 202080028521.1, dated Oct. 8, 2024, pp. 1-19.

"Chinese Search Report for Chinese Application No. 202080028521. 1", dated Sep. 25, 2024, pp. 1-4.

* cited by examiner

MULTI-ROLE DEVICES FOR AUTOMATION ENVIRONMENTS

CROSS-REFERENCE TO RELATED APPLICATIONS

The present application is a continuation of U.S. patent application Ser. No. 16/790,133 filed on Feb. 13, 2020 by Robert P. Madonna et al., now issued on Jan. 2, 2024, as U.S. Pat. No. 11,863,343, for a MULTI-ROLE DEVICES FOR AUTOMATION ENVIRONMENTS, which claims the benefit of U.S. Provisional Patent Application Ser. No. 62/805,456, which was filed on Feb. 14, 2019, by Robert P. Madonna et al. for MULTI-ROLE DEVICES FOR AUTOMATION ENVIRONMENTS, both of which are hereby incorporated by reference in their entirety.

INCORPORATED PATENTS AND APPLICATIONS

U.S. Pat. No. 7,930,644, issued Apr. 19, 2011, and entitled PROGRAMMING ENVIRONMENT AND METADATA MANAGEMENT FOR PROGRAMMABLE MULTIMEDIA CONTROLLER, is assigned to a common assignee with the present application and is hereby incorporated by reference. U.S. Pat. No. 8,213,463, issued Jul. 3, 2012, and entitled LOCATION-BASED SHARING OF MULTIMEDIA CONTROL RESOURCES, is assigned to a common assignee with the present application and is hereby incorporated by reference. U.S. Pat. No. 8,296,669, issued Oct. 23, 2012, and entitled VIRTUAL ROOM-BASED LIGHT FIXTURE AND DEVICE CONTROL, is assigned to a common assignee with the present application and is hereby incorporated by reference. U.S. Pat. No. 8,659,704, issued Feb. 25, 2014, and entitled APPARATUS AND METHOD FOR MIXING GRAPHICS WITH VIDEO IMAGES, is assigned to a common assignee with the present application and is hereby incorporated by reference. U.S. Pat. No. 9,153,125, issued Oct. 6, 2015, and entitled PROGRAMMABLE MULTIMEDIA CONTROLLER WITH PROGRAMMABLE SERVICES, is assigned to a common assignee with the present application and is hereby incorporated by reference. Co-pending application Ser. No. 16/123,731, filed Sep. 6, 2018, now issued on Apr. 7, 2020 as U.S. Pat. No. 10,613,704 and entitled SMALL SCREEN VIRTUAL ROOM-BASED USER INTERFACE, is assigned to a common assignee with the present application and is hereby incorporated by reference. Co-pending application Ser. No. 16/254,245, filed Jan. 22, 2019, now issued on Apr. 4, 2023 as U.S. Pat. No. 11,622,179 and entitled DEVICE MOUNTING SYSTEM, is assigned to a common assignee with the present application and is hereby incorporated by reference.

FIELD OF THE INVENTION

The present invention relates generally to the field of automation and, more specifically, to enhancing the capabilities of various devices to enable them to perform multiple roles in automation environments.

BACKGROUND INFORMATION

Demand for automation of residential and commercial environments has resulted in a dramatically expanding market of "smart" doorbells, thermostats, lighting, security systems, audio, video, and numerous other devices. These devices are offered by a substantial number of manufacturers who, for competitive or performance reasons, have adopted different control protocols that are not generally compatible with each other. Thus, a "smart" thermostat offered by one manufacturer does not operate in accordance with a widely adopted standard, and often will not interoperate with "smart" lighting offered by a different manufacturer. Among other disadvantages, this lack of interoperability limits the choices of an end user in selecting devices for a particular automation environment. Another disadvantage is that an end user is prevented from is effectively controlling all of the devices in an environment with a single control device (e.g., remote control, smartphone, or tablet).

As a result, an end user is often forced to either select one manufacturer, even though that manufacturer does not offer all of the "smart" devices of interest to the end user, or select multiple manufacturers at increased cost and lack of interoperability.

SUMMARY OF THE INVENTION

In accordance with one aspect of the invention, an automation control device, such as a host or hub, is provided with enhanced functionality so that it becomes a multi-role automation control device. The multi-role automation control device is capable of controlling an expanded variety of "smart" or other devices whose native control protocol is not generally compatible. The multi-role automation control device may be implemented using a variety of underlying devices including a host, hub, soundbar, "smart" thermostat, "smart" amplifier, audio speaker, or other device.

In accordance with another aspect of the invention, an automation control hub is provided with enhanced functionality so that it becomes a multi-role automation control hub. Leveraging high performance graphics processing available in the automation control hub, the multi-role automation control hub is provided with an enhanced on screen display. The enhanced on screen display provides a user interface for automation control over an expanded variety of devices than the automation control hub is capable of controlling with its native functionality. The enhanced on screen display may also provide advanced video display management including windowing, tiling, and picture-in-picture among others. The enhanced on screen display may also support configuration, as well as real time control and status of substantially all aspects of an automation environment. More specifically, the enhanced on screen display may provide access to and control over services, favorites, scenes, automations, and scheduling.

In addition, multiple automation control hubs with enhanced on screen displays may be pooled together as a shared resource that distributes such on screen displays to a large number of TVs or video monitors. Such distribution may be effected by transmitting or streaming over IP dedicated to a TV HDMI.

In accordance with another aspect of the invention, a ceiling or wall mountable speaker, which includes wired network connectivity, is provided with additional functionality including wireless network connectivity. As a result, each speaker becomes a multi-role speaker that functions both as an audio output device as well as a wireless network access point. In addition, the multi-role speaker may perform a third role, an automation control device, as referenced above.

In accordance with another aspect of the invention, an automation control hub is provided with AVB network connectivity and becomes a multi-role automation control hub. Through an AVB network, the multi-role automation control hub distributes music to networked speakers, soundbars, or other devices.

BRIEF DESCRIPTION OF THE DRAWINGS

The invention description below refers to the accompanying drawings, of which.

DETAILED DESCRIPTION OF ILLUSTRATIVE EMBODIMENTS

Figure 1:
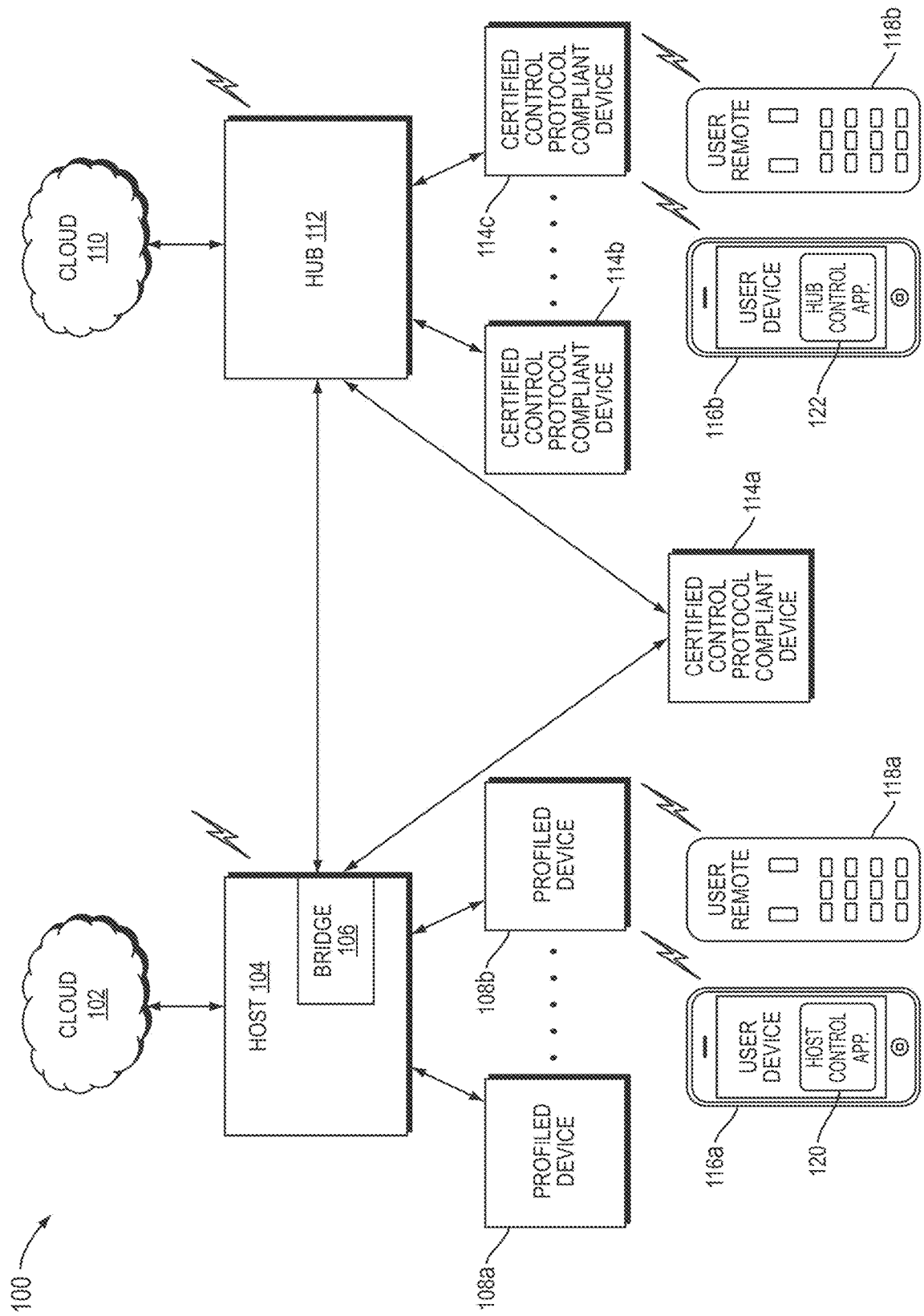
FIG. 1 is a block diagram an automated environment which includes a multi-role automation host in accordance with one aspect of the present invention.

FIG. 1 shows an automation environment 100 which includes a multi-role automation host 104. A first network cloud 102 is accessible by multi-role automation host 104. Multi-role automation host 104 includes a system configuration (not shown) which, in turn, includes a component or device profile (not shown) associated with each profiled device 108a . . . 108b controlled by multi-role automation host 104. In general, a device profile is a file or other data structure which describes the inputs, outputs, and available set of commands for the associated device. Through either internal storage, network cloud 102, or another external source, multi-role automation host 104 must have access to an associated device profile in order to control a given device.

Examples of a system configuration, component profile, and hardware and software suitable for multi-role automation host 104 may be found in U.S. Pat. No. 9,153,125 incorporated by reference above.

A user may interact with, and effectively control, multi-role automation host 104 by operating a user device 116a running a host control application 120 which is compatible with multi-role automation host 104. User device 116a may be implemented with a smartphone, tablet, or other device capable of running host control application 120 and having appropriate network connectivity to communicate with multi-role automation host 104. Alternatively, a user may interact with and effectively control multi-role automation host 104 using a user remote 118a which is compatible with multi-role automation host 104. Multi-role automation host 104 may, for example, be based upon a Smart Host Model SHC-S2-00, a surround sound soundbar, a "smart" Multistat thermostat, a "smart" audio speaker (as described below in connection with FIG. 8), a "smart" amplifier (as described below in connection with FIG. 9), or other devices offered by Savant Systems, LLC of Hyannis, MA.

A second network cloud 110 is accessible by an automation hub 112. Unlike multi-role automation host 104 which is capable of controlling any profiled device, automation hub 112 is conventionally capable of controlling only devices 114a-114c which have been certified as control protocol compliant (i.e., devices which have been certified as compliant with the control protocol specified by the manufacturer of automation hub 112).

A user may interact with and effectively control automation hub 112 by operating a user device 116b running a hub control application 122 which is compatible with automation hub 112. User device 116b may be implemented with a smartphone, tablet, or other device capable of running hub control application 122 and having appropriate network connectivity to communicate with automation hub 112. Alternatively, a user may interact with and effectively control automation hub 112 using a user remote 118b which is compatible with automation hub 112. Automation hub 112 may, for example, be based on an Apple TV®, HomePod™, or iPad® running HomeKit®, all of which are offered by Apple Inc. of Cupertino, CA.

Multi-role automation host 104 includes an automation bridge 106. In one embodiment, an SDK available from Apple Inc. may be used to create automation bridge 106 and embed it in multi-role automation host 104. As described in greater detail below, automation bridge 106 functions, in part, to communicate (bidirectionally) with automation hub 112 using the same manufacturer-specified control protocol as used by certified control protocol compliant devices 114a-114c. Automation bridge 106 also functions to convert control protocol messages received from automation hub 112 to an appropriate form for processing by multi-role automation host 104 (and vice versa). Advantageously, through such communication and protocol translation, and depending upon the type of device, profiled devices 108a . . . 108b as well as user remote 118a are exposed to automation hub 112. That is, profiled devices 108a . . . 108b and user remote 118a, even though not certified as compliant with the control protocol used by automation hub 112, become visible to and controllable by automation hub 112 by virtue of multi-role automation host 104.

Figure 2:
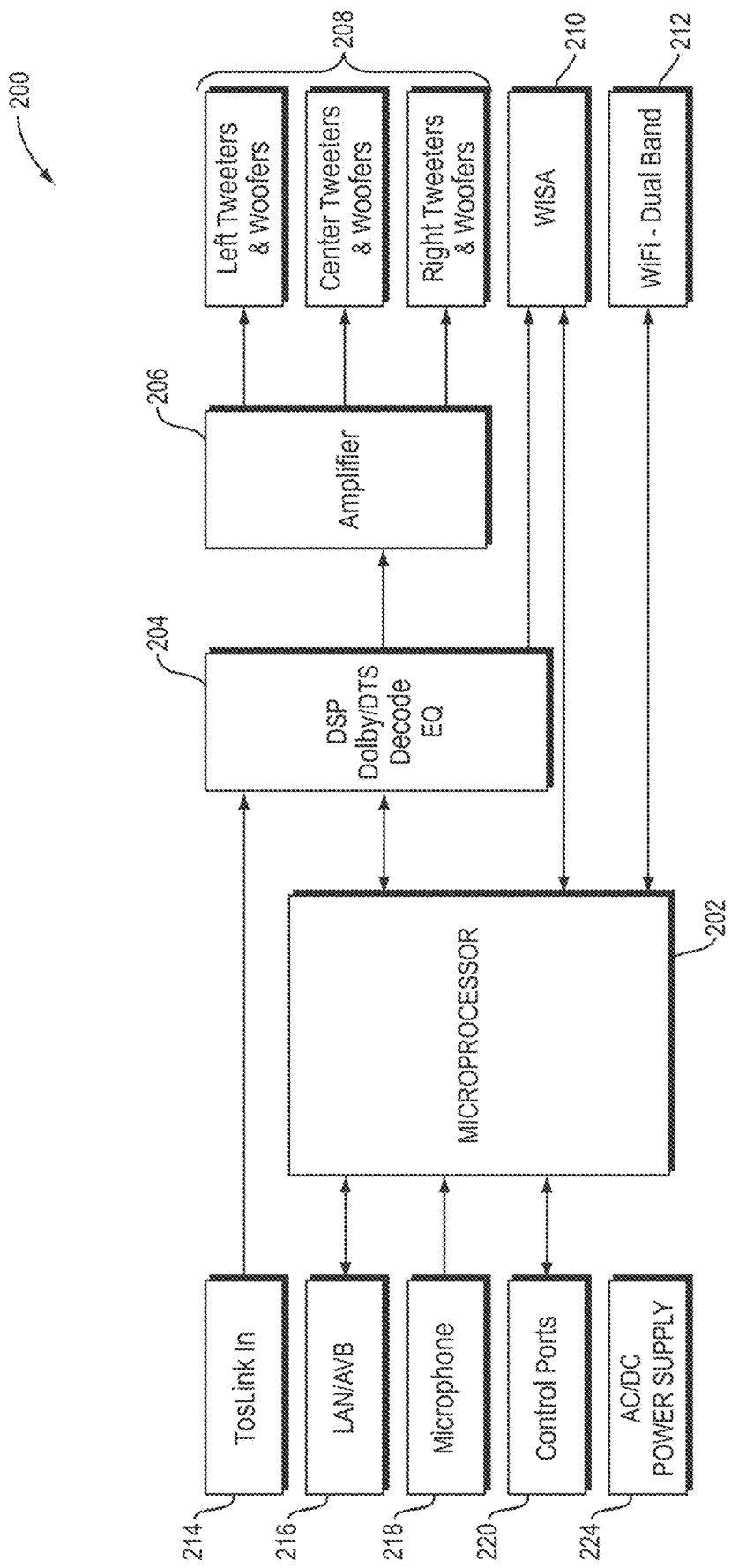
FIG. 2 is a block diagram of a soundbar which may be used as a base for the multi-role automation host shown in FIG. 1.

FIG. 2 shows a block diagram of a powered surround sound soundbar 200 which may be used to implement multi-role automation host 104 (FIG. 1). A microprocessor 202 is coupled in bidirectional communication with an audio digital signal processor (DSP) 204. Audio DSP 204 is also coupled to a TosLink 214. Audio DSP 204 is coupled to digital to analog converters (not shown) whose outputs are coupled to an amplifier 206 whose outputs are coupled to various audio speakers 208.

Microprocessor 202 is also coupled in bidirectional communication with a WISA module 210 as well as a WiFi dual band module 212. In addition, microprocessor 202 is coupled to an LAN/AVB port 216, a microphone 218, control ports 220 which may include RS232 control portsinfrared (IR) control ports, or other control ports. An AC/DC power supply 224 provides power to soundbar 200.

Figure 3:
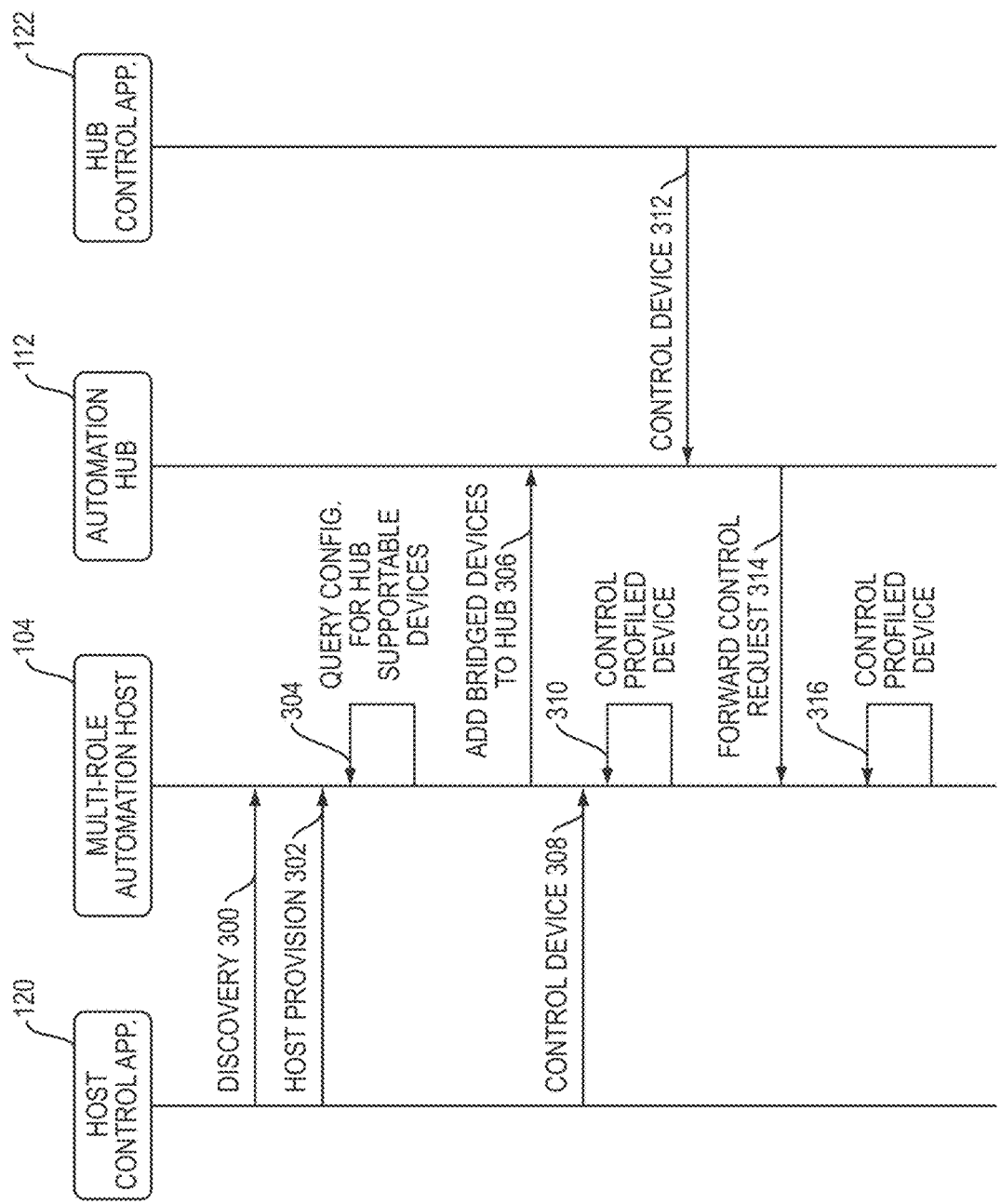
FIG. 3 is a message flow diagram of the illustrating an example of higher level messaging performed by the multi-role automation host and other devices shown in FIG. 1.

FIG. 3 shows a message flow diagram illustrating an example of higher level messaging needed to make profiled devices 108*a* . . . 108*b* and user remote 118*a* (FIG. 1) visible to and controllable by automation hub 112. Host control application 120, running on user device 116*a*, initiates a Discovery protocol 300 with multi-role automation host 104. Host control application 120 next sends a Host Provision message 302. In response, multi-role automation host 104 proceeds to Query 304 its configuration to identify any (profiled) device(s) that is of an appropriate type to be supported/controlled by automation hub 112. Assuming at least one profiled device of an appropriate type is identified, multi-role automation host 104, through bridge 106, transmits an Add Bridged is Devices to Hub message 306 to automation hub 112.

Subsequently, host control application 120 issues a Control Device message 308 to multi-role automation host 104 which responds by exerting control 310 over the profiled device to which message 308 is directed. In contrast, when hub control application 122 issues a Control Device message 312 that is directed to a profiled device, automation hub 112 responds by forwarding a Control Request message 314 to multi-role automation host 104. In turn, multi-role automation host 104 responds by exerting control 316 over the profiled device to which message 312 is directed.

Figure 4:
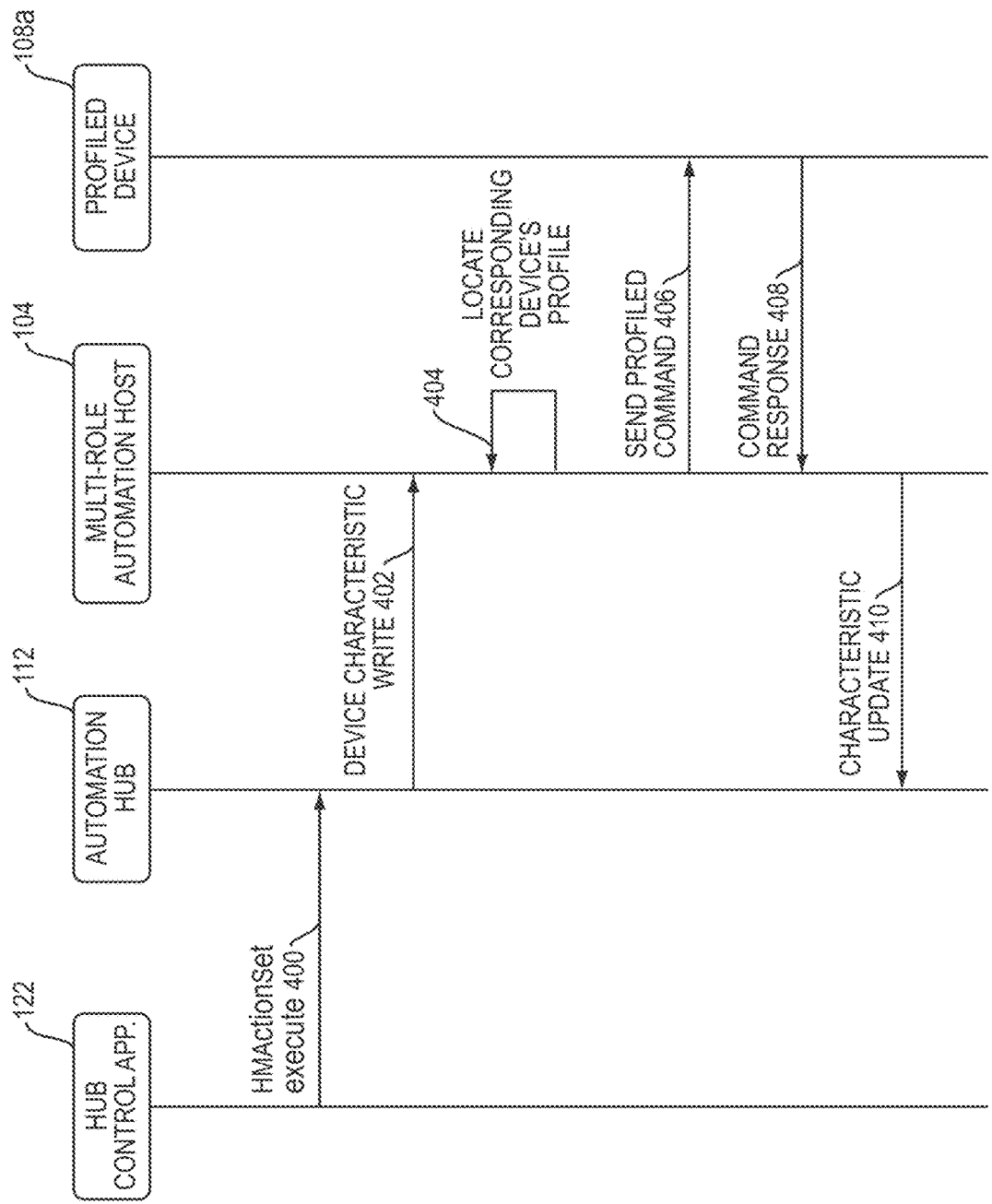
FIG. 4 is a message flow diagram of the illustrating an example of lower level messaging performed by the multi-role automation host and other devices shown in FIG. 1.

FIG. 4 shows a message flow diagram illustrating an example of lower level messaging that occurs when hub control application 122 and automation hub 112 are exerting control over profiled device 108*a* that has become visible through multi-role automation host 104 as described above. In this example, automation hub 112 represents an Apple TV®, HomePod™, or iPad® running HomeKit®. Hub control application 122 issues a HMActionSet execute message 400 to automation hub 112 which, in turn, issues a Device Characteristic Write message 402 to multi-role automation host 104. Device Characteristic Write message 402 could represent, for example, to dim a lamp.

In response, multi-role automation host 104 locates the profile corresponding with the device 404 to which message 402 is directed, and then sends a profiled command 406 to device 108*a*. Profiled command 406 is in substance comparable to message 402 but is prepared by multi-role automation host 104 in a form that is expected and understood by device 108*a*. Following receipt and execution of profiled command 406, device 108*a* sends a command response 408 to multi-role automation host 104 which, in turns, sends a Characteristic Update message 410 to automation hub 112.

Figure 5:
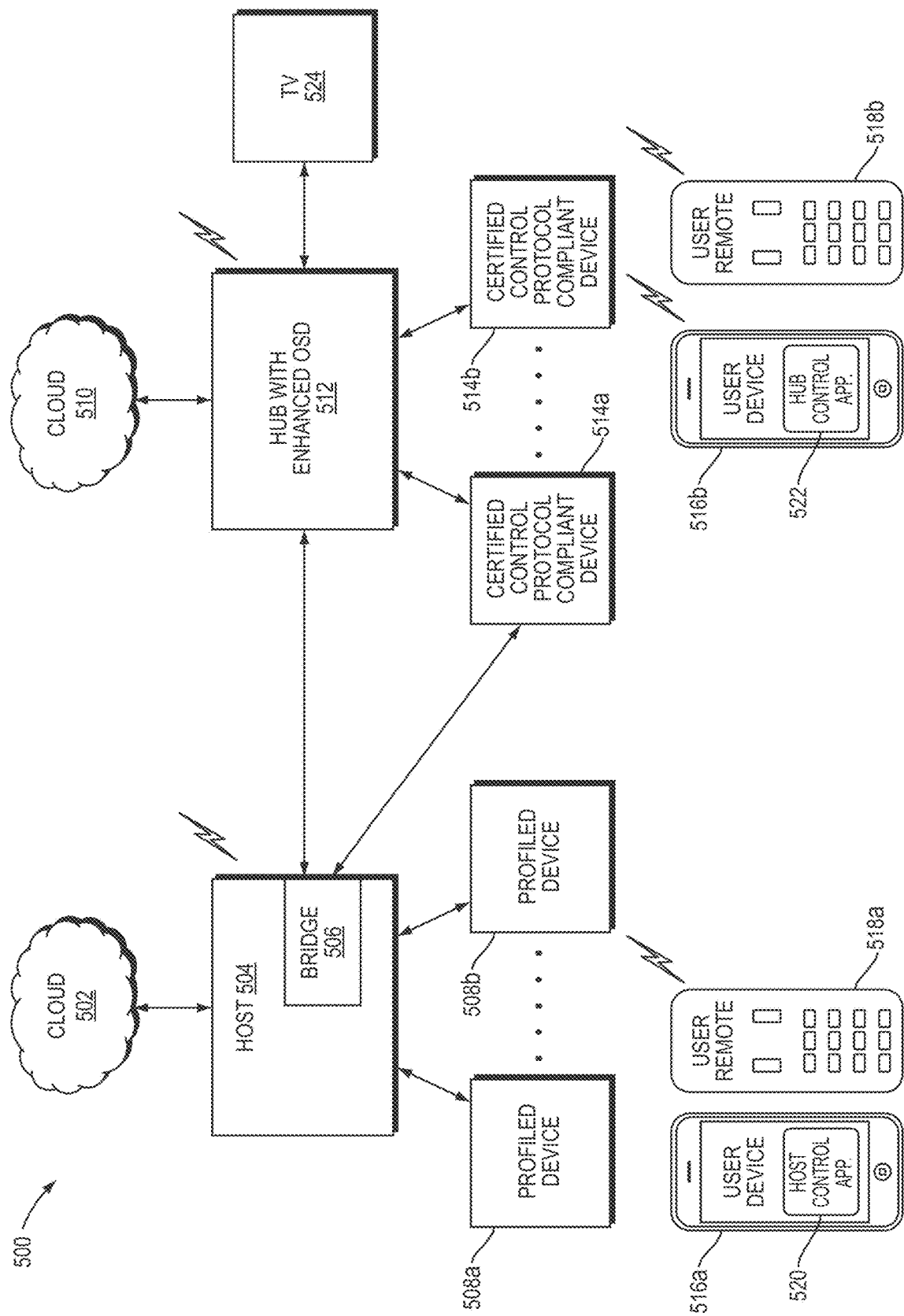
FIG. 5 is a block diagram of an automated environment which includes a multi-role automation hub that provides an enhanced on screen display in accordance with one aspect of the present invention.

Turning now to FIG. 5, an automation environment 500 is shown. In general, each component or device shown in FIG. 5 may include comparable structure and function to the corresponding component or device shown in FIG. 1 and described above with one exception. A multi-role automation hub 512, in its role as a hub, functions in a substantially comparable manner to automation hub 112 (FIG. 1) described above. However, multi-role automation hub 512, in an additional role, produces an enhanced on screen display (EOSD) for a television 524.

In a preferred embodiment, as referenced above, automation hub 112 may be based on Apple TV® running HomeKit®. While Apple TV® includes a limited on screen display which allows a user to select audio/video to play, or power on/off an attached TV, that limited on screen display is not capable of controlling other devices. However, Apple TV® does include a high performance graphics processing capability.

In accordance with one aspect of the present invention, an application is provided which runs on Apple Inc.'s tvOS®, and leverages the high performance graphics processing built into Apple TV® to produce an EOSD 600 as shown in FIGS. 6A-6D. By placing an Apple TV® into a lockdown mode, the Apple TV® will automatically boot up into the application which produces EOSD 600.

Figure 6A:
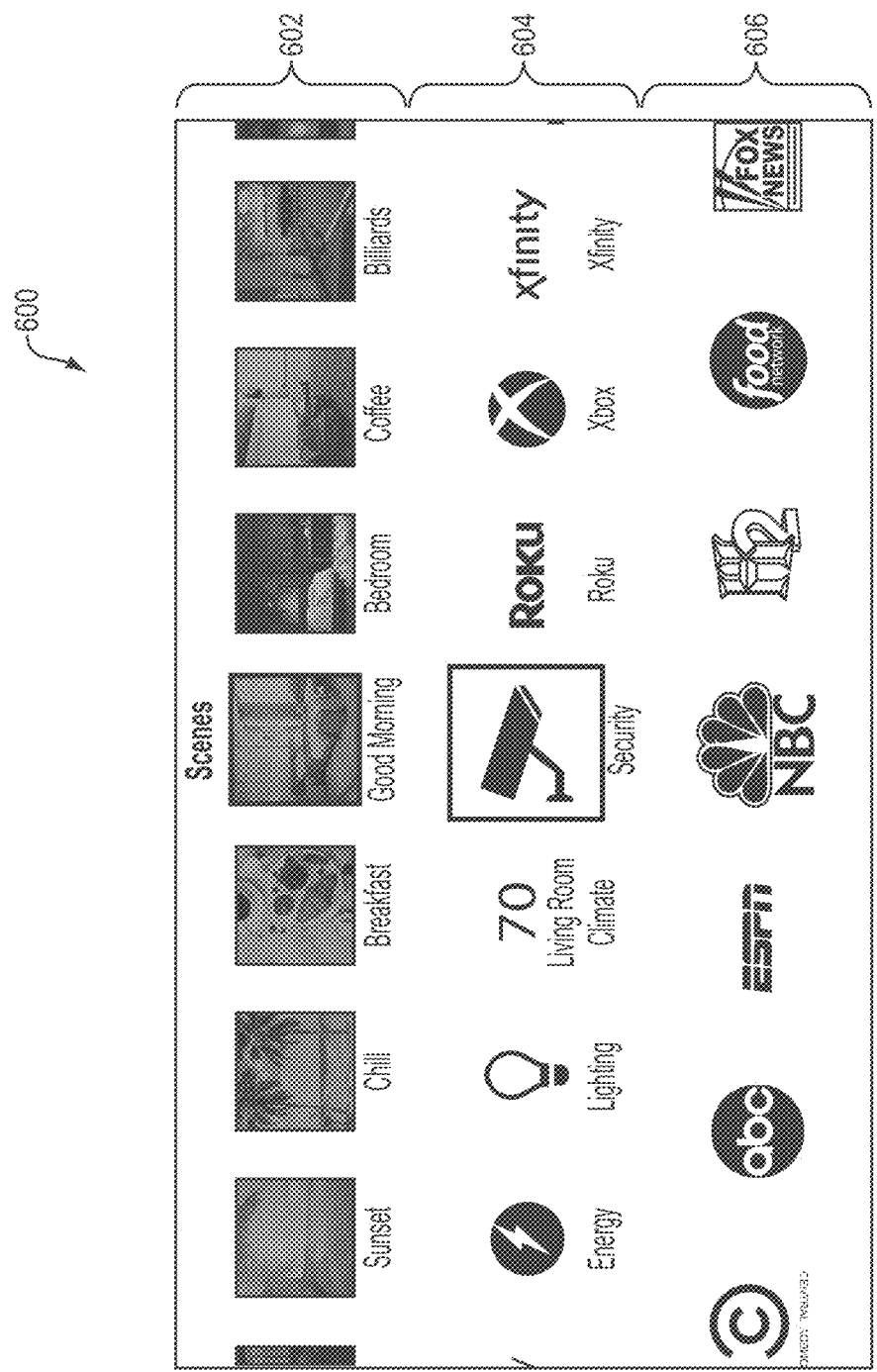
FIGS. 6A-6D are exemplary screenshots of the enhanced on screen display produced by the multi-role automation hub shown in FIG. 5.
Figure 6B:
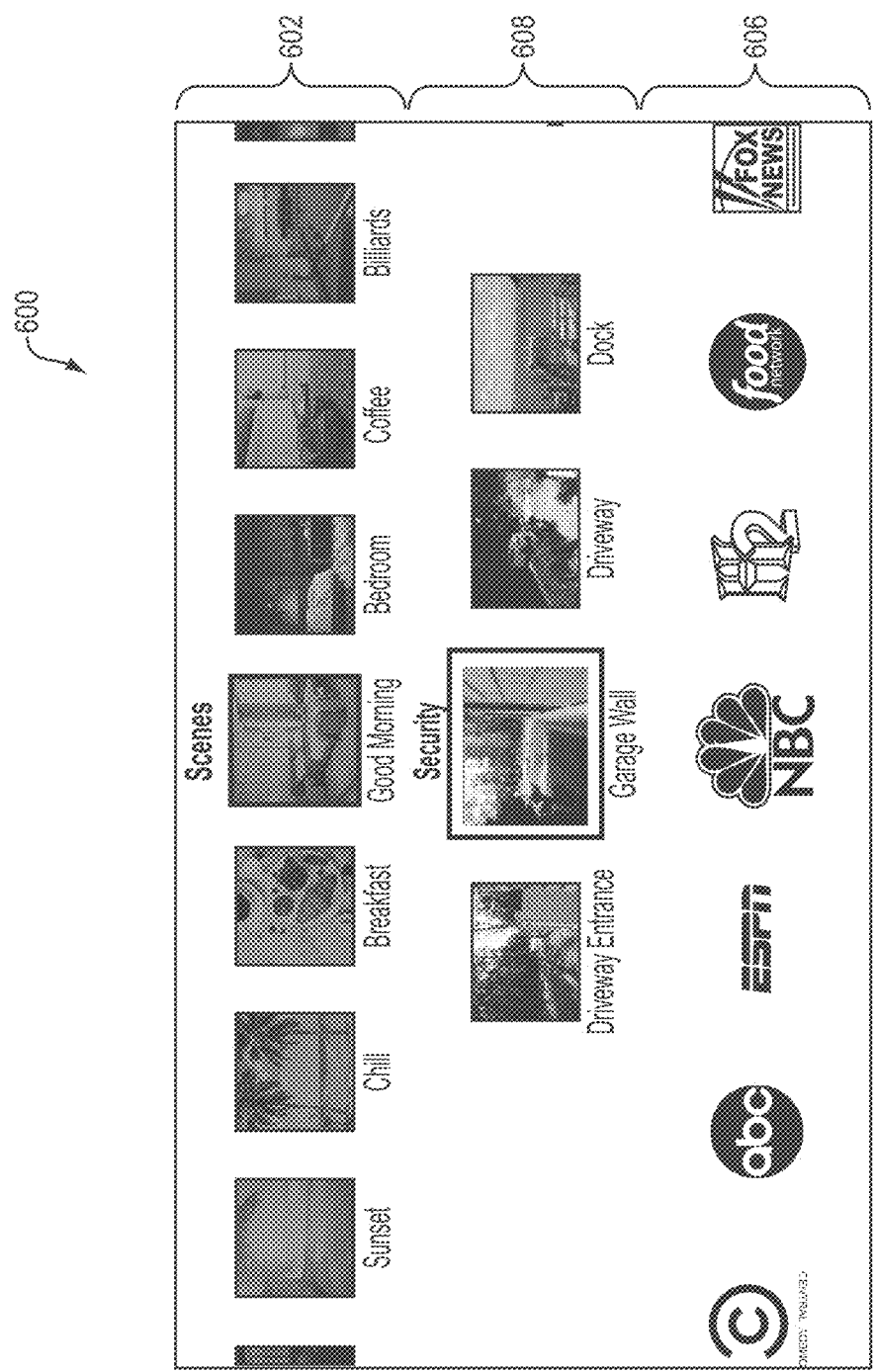

As shown in FIG. 6A, EOSD 600 may be formatted as three horizontal bands of rotating icons, graphics, images, video or other content. For example, band 602 displays a series of "Scenes" corresponding to various rooms or areas of a home. When a user selects a particular "Scene" (by interacting with EOSD 600 using user devices 516*a* or 516*b*, or user remotes 518*a* or 518*b* (FIG. 5)) to center and select the corresponding image, previously defined conditions or states of lighting, devices, shades, media, or any other resource that is under the control of multi-role automation host 504 or multi-role automation hub 512, will be set in the selected room or area.

Figure 6C:
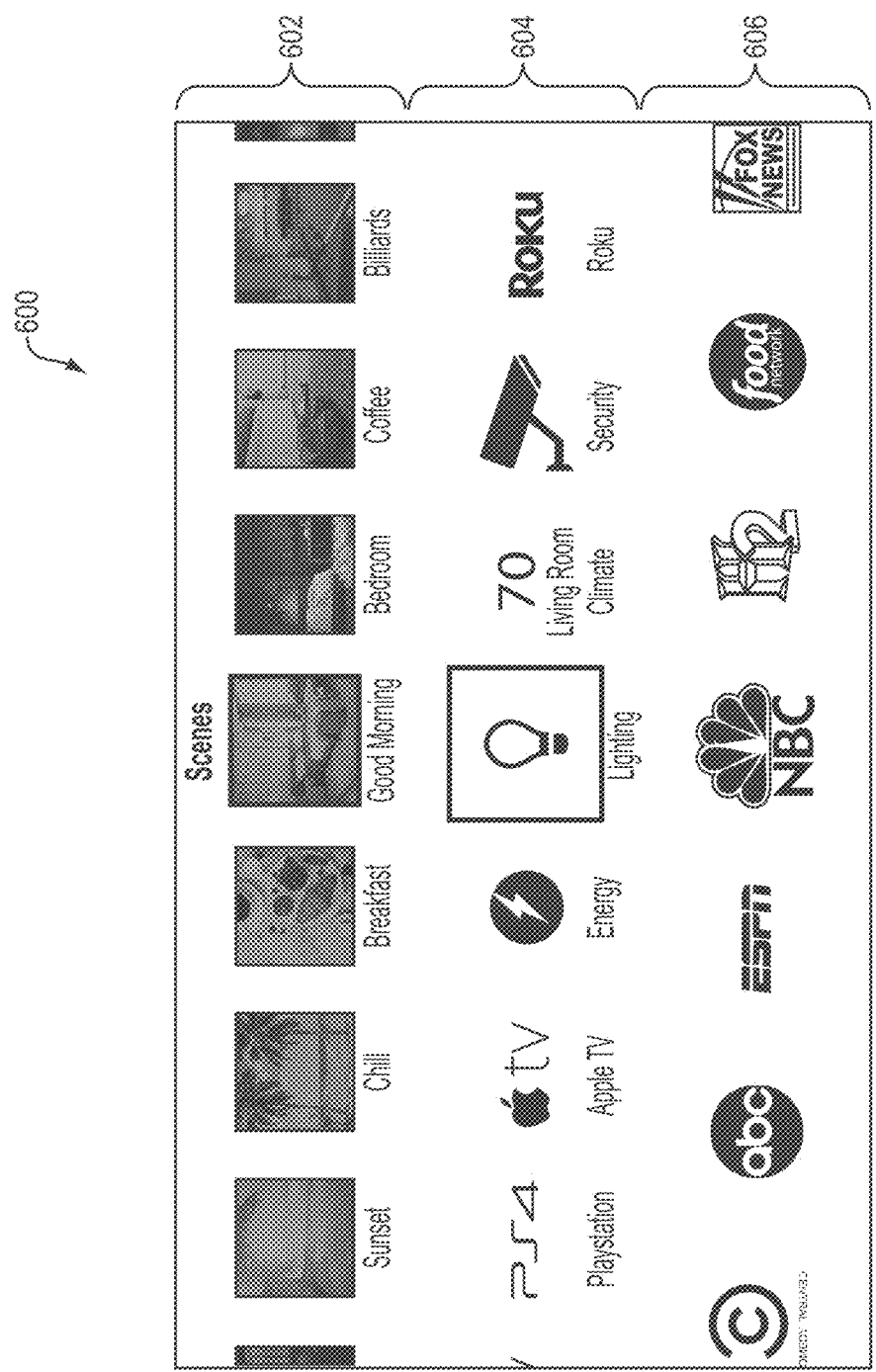
Figure 6D:
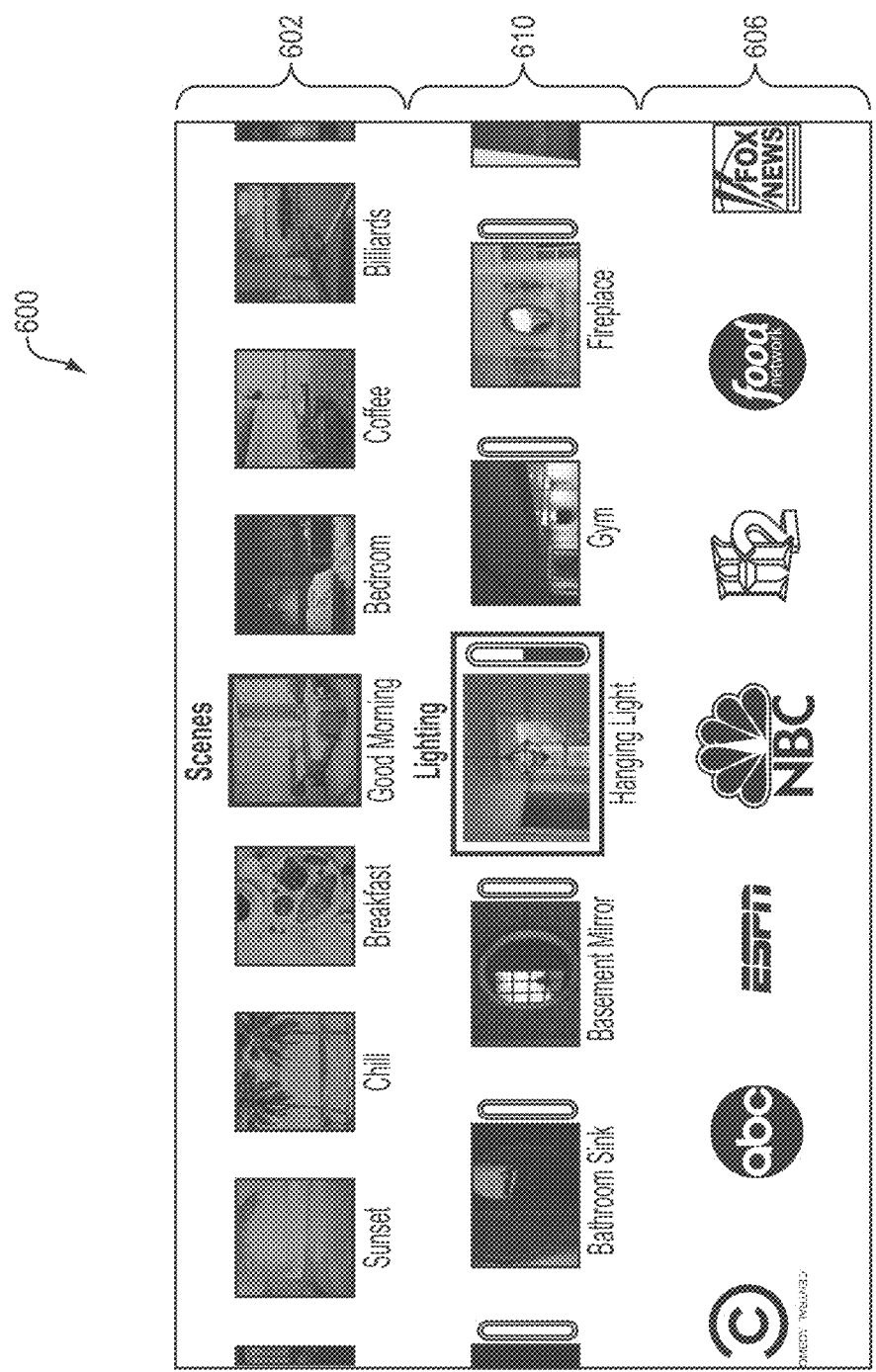

Band 604 of EOSD 600 displays icons corresponding to various systems and services. When a user selects a centered "Security" icon, EOSD 600 transitions to a screen shown in FIG. 6B in which band 608 displays live feeds from several closed circuit security cameras. Similarly, as shown in FIG. 6C, when a user selects a centered "Lighting" icon, EOSD 600 transitions to a screen shown in FIG. 6D in which band 610 displays true images of the current lighting conditions of individual rooms or lamps along with a vertical slider bar control. Exemplary techniques for generating and displaying such true images of current lighting conditions are described in U.S. Pat. Nos. 8,296,669, and 10,613,704, both of which are incorporated by reference above.

EOSD 600 may also provide advanced video display management including windowing, tiling, and picture-in-picture among others. Details regarding hardware and is software for generating EOSD 600 may be found in the patents and pending patent applications incorporated by reference above.

Figure 7:
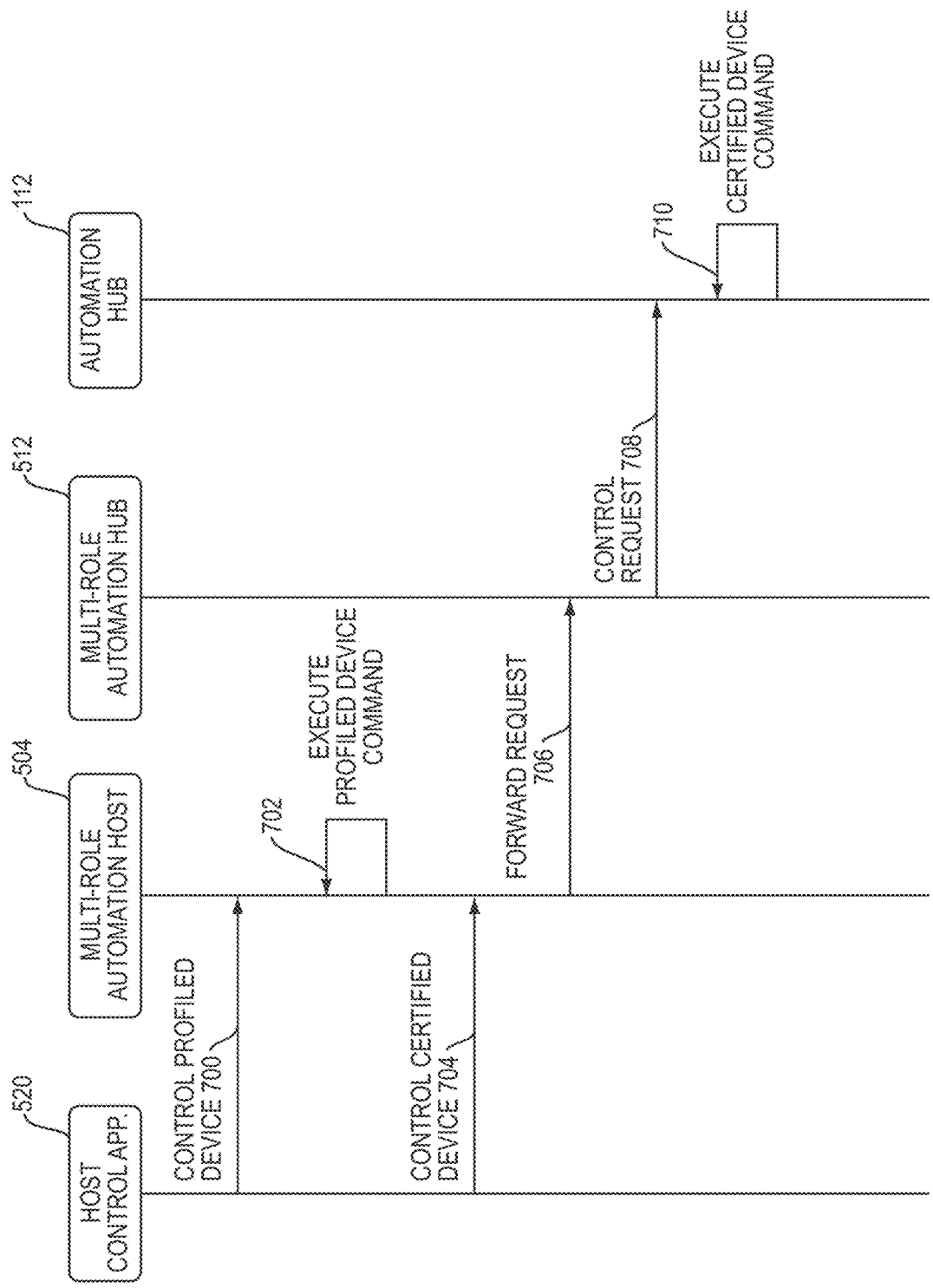
FIG. 7 is a message flow diagram illustrating an example of higher level messaging performed by the multi-role automation hub with enhanced on screen display shown in FIG. 5.

FIG. 7 shows a message flow diagram illustrating an example of lower level messaging that occurs when multi-role automation hub 512 with EOSD 600 interacts with multi-role automation host 504. Host control application 520 issues a Control Profiled Device message 700 to multi-role automation host 504. Because message 700 is directed to a profiled device, multi-role automation host 504 proceeds to Execute Profiled Device Command 702.

Subsequently, host control application 520 issues a Control Certified Device message 704. Because message 704 is not directed to a profiled device, multi-role automation host 504 issues a Forward Request message 706, via bridge 506, to multi-role automation hub 512. Multi-role automation hub 512, in turn, issues a Control Request message 708 to automation hub 112 which proceeds to Execute Certified Device Command 710.

In accordance with one aspect of the invention, an application is provided which runs on Apple Inc.'s tvOS®, and provides the necessary functionality to transform an Apple TV® into multi-role automation host. Other devices which are controllable by a dedicated remote may also be suitable to serve as a multi-role automation host. In general, the application embodies all necessary automation host functionality including the ability to recognize and control profiled devices. Because of the native functionality of an Apple TV®, this type of multi-role automation host is capable of effectively controlling a mix of profiled devices and certified devices without an additional hub or other intermediate device. In addition, the capability of this type of multi-role automation host may be further enhanced by the addition of AVB network connectivity. Such connectivity, in the case of an Apple TV® multi-role automation host, permits distribution of music in digital form directly to AVB enabled speakers, soundbars or other devices.

Figure 7A:
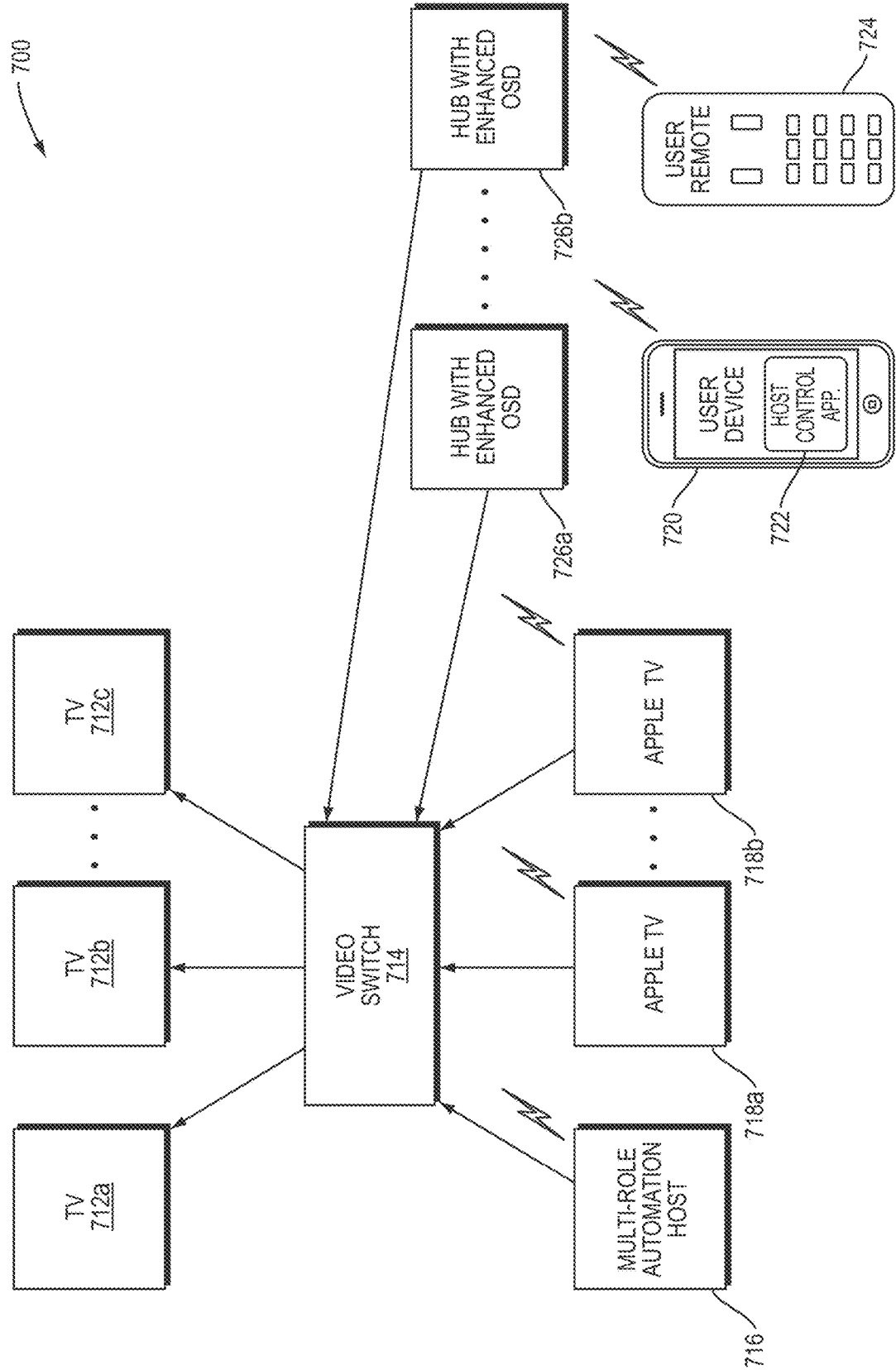
FIG. 7A is a block diagram of an automated environment in which multiple are pooled to become a shared resource.

In accordance with another aspect of the invention, multiple Apple TVs may be pooled together to become a shared resource for multiple TVs. As shown in FIG. 7A, an automated environment 700 includes a group of TVs 712a-712c, each of which is coupled to a video switch 714. A multi-role automation host 716 is coupled to video is switch 714, as are multiple Apple TVs 718a and 718b, and multiple hubs with enhanced OSD 726a and 726b (which are substantially similar to hub with enhanced OSD 512 (FIG. 5) described above).

In general, in response to commands from multi-role automation host 716, video switch 714 functions to set up and tear down video signal connections or paths between various ones of TVs 712a-712c, and various ones of Apple TVs 718a-718b or hubs with enhanced OSD 726a-726b. Multi-role automation host 716 may also command video switch 714 to set up a video signal connection between a single Apple TV 718a-718b and multiple TVs 712a-712c. Similarly, multi-role automation host 716 may also command video switch 714 to set up a video signal connection between a single hub with enhanced OSD 726a-726b and multiple TVs 712a-712c.

Figure 7B:
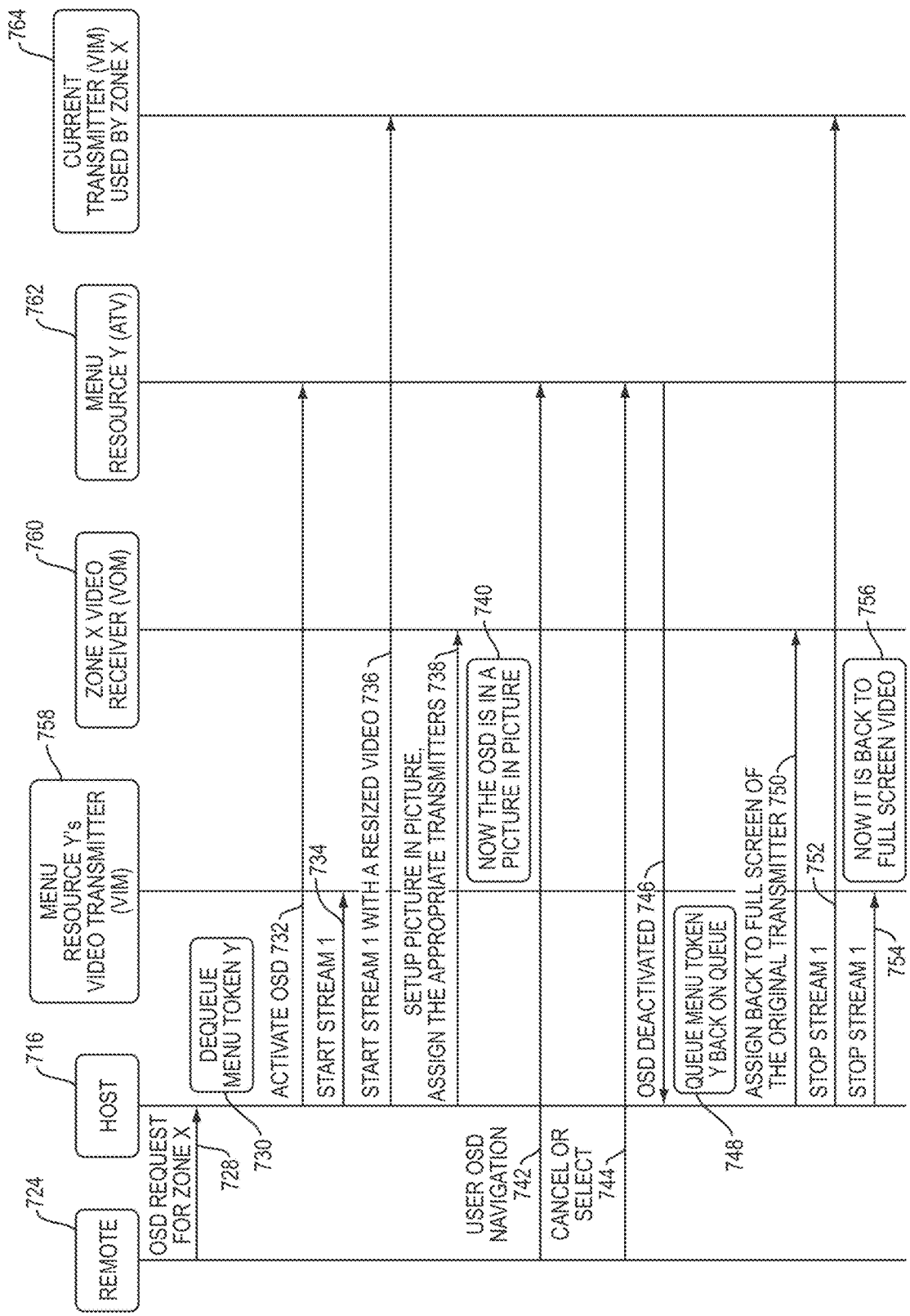
FIG. 7B is a message flow diagram illustrating communication among various devices in FIG. 7A.

FIG. 7B is a message flow diagram illustrating communication among various devices in FIG. 7A needed to display an enhanced OSD on one of TVs 712a-712c. The communication begins with a user (not shown) pressing a button on user remote 724 which causes transmission of an OSD Request for Zone X message 728 to multi-role automation host 716. Multi-role automation host 716 responds first by Dequeue Menu Token Y which, in effect, dedicates a particular Apple TV 718a-718b (associated with the token) to the requested OSD session. Next, multi-role automation host 716 transmits an Activate OSD message 732 to a Menu Resource Y 762 (i.e., a particular Apple TV associated with Token Y). This is followed by a Start Stream 1 message 734 from multi-role automation host 716 to a Menu Resource Y's Video Transmitter 758 which, in turn, is followed by a Start Stream 1 With Resized Video message 736 to Current Transmitter Used By Zone X 764.

Next, multi-role automation host 716 sends a message 738 to Zone X Video Receiver 760 which sets up picture in picture and assigns the appropriate transmitters. At this point, the enhanced OSD appears in a picture in picture 740. A User OSD Navigation message 742 is then transmitted from user remote 724 to Menu Resource Y 762. This is followed by a Cancel or Select message 744 from user remote 724. If a Cancel message 744 was transmitted, an OSD Deactivated message 746 is transmitted from Menu Resource Y to multi-role automation host 716. This is followed by Menu Token Y being returned to the Queue 748 because the OSD session is over.

Subsequently, a message 750 is transmitted from multi-role host 716 to restore full screen video for the original transmitter. This is followed by a Stop Stream 1 message 752 to Current Transmitter 764, a Stop Stream 1 message to Menu Resource Y's Video Transmitter 758, and restoration of full screen video 756.

In addition, similar to the enhanced OSD example described above, other services available on an Apple TV 718a-718b may be shared with multiple TVs 712a-712c. Thus, services such as Netflix, Weather, or many others may be shared with multiple TVs 712a-712c by placing an Apple TV in lockdown mode and transmitting the selected video over IP, taking advantage of video switch 714 to set up the appropriate video connections.

Figure 8:
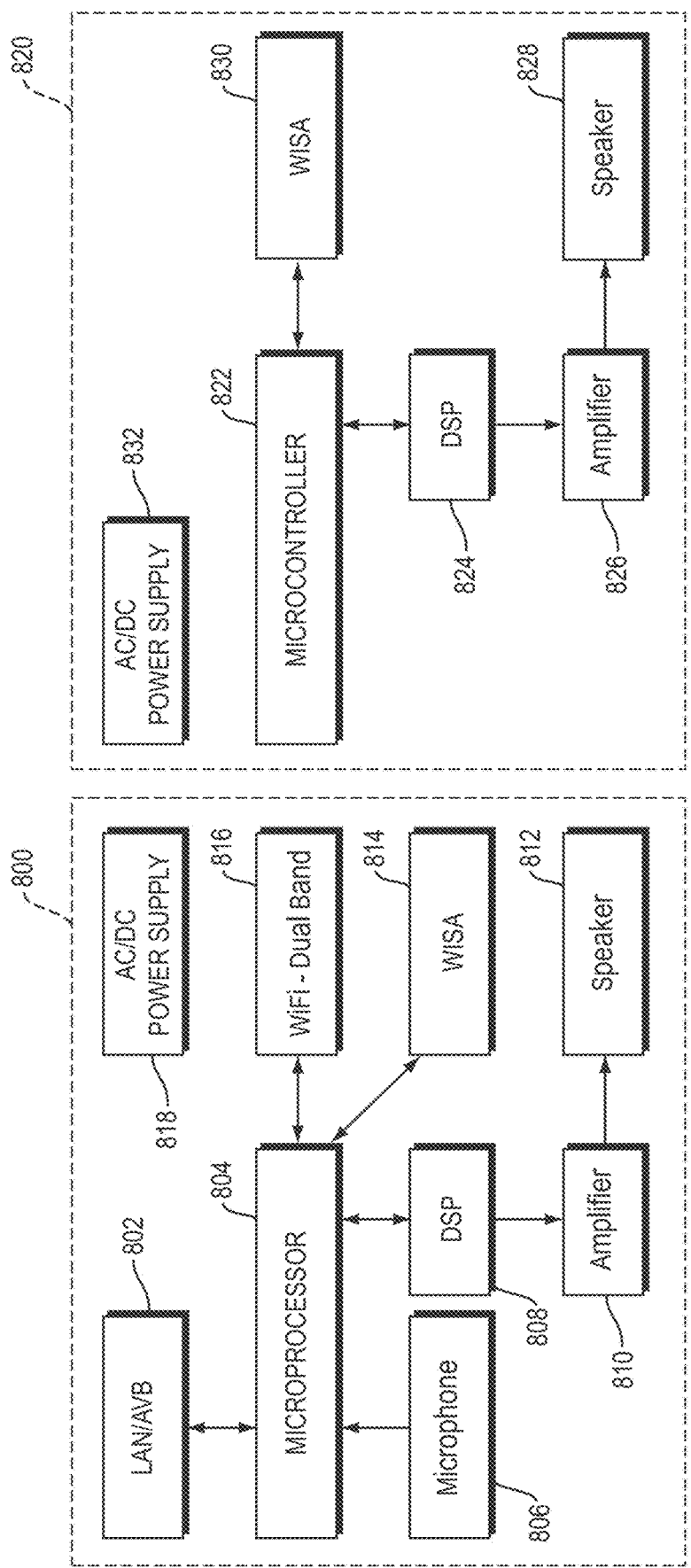
FIG. 8 is a block diagram of a multi-role speaker in accordance with one aspect of the present invention.

In accordance with another aspect of the invention, a ceiling or wall mountable speaker, such as those disclosed in co-pending application Ser. No. 16/254,245 and incorporated by reference above, or bookshelf or other speaker, is provided enhanced functionality and becomes a multi-role speaker. The previously disclosed speakers include a LAN/AVB port through which both digital audio and power over Ethernet (PoE) are received. As shown in FIG. 8, a multi-role speaker 800 includes a LAN/AVB port 802 coupled to a microprocessor 804. A microphone 806 is coupled to microprocessor 804 as is a digital signal processor (DSP) 808. An amplifier 810 is coupled to DSP 808 as well as speaker 812. Multi-role speaker 800 also includes a WISA module 814 and a WiFi dual band module 816, both of which provide wireless connectivity. Through its WISA module 814 or LAN/AVB port 802, multi-role speaker 800 may distribute digital audio in either of two forms: 16-bit, 44.1 kHz form (used in Airplay 2), or higher fidelity 24-bit, 96 kHz form.

Through its WiFi dual band module 816, multi-role speaker 800 provides support for Airplay 2 as well as serving as a wireless access point. To provide whole house audio, speakers are frequently distributed throughout most rooms or other areas of a house. By providing such speakers with wireless network connectivity so that they become multi-role speakers, robust wireless network coverage is attained without the necessity of separate wireless access points. Through its WISA module 814, multi-role speaker 800 may be paired with a WISA speaker 820 to provide stereo sound. Paired WISA speaker 820 includes a microcontroller 822 which is coupled to a WISA module 830 and a DSP 824. DSP 824 is coupled to an amplifier 826, which in turn is coupled to is a speaker 828. In general, paired WISA speaker 820 receives digital audio from multi-role speaker 800 via WISA module 830.

Within an automation environment 100 (FIG. 1), multi-role speaker 800 is capable of serving in any combination of four roles: audio speaker; multi-role automation host 104 (FIG. 1); wireless access point; and pairing with WISA speaker 820.

Figure 9:
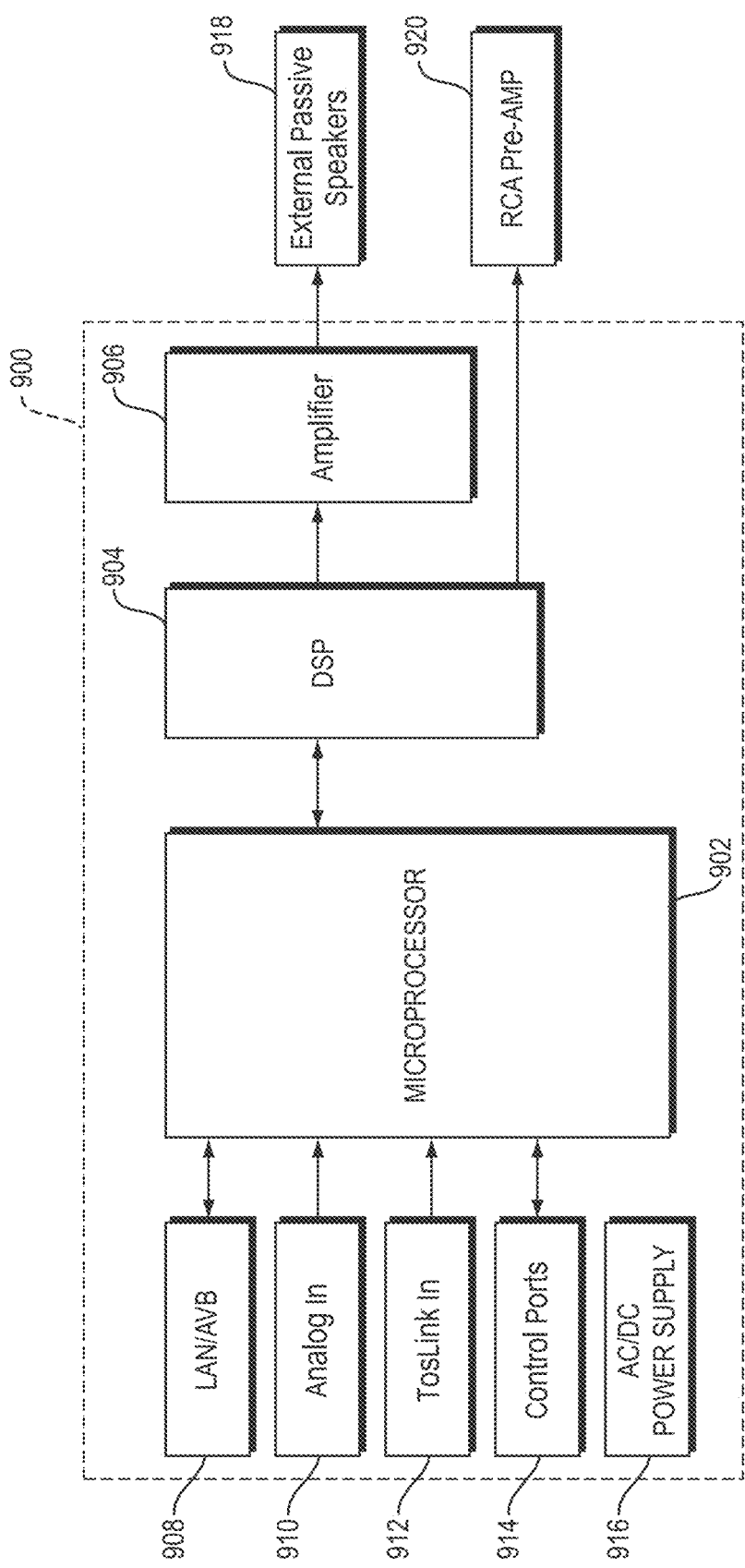
FIG. 9 is a block diagram of a multi-role amplifier in accordance with one aspect of the present invention.

FIG. 9 shows a multi-role amplifier 900 which includes a microprocessor 902 coupled to a DSP 904 which in turn is coupled to an amplifier 906. Microprocessor 902 is coupled, respectively, to a LAN/AVB port 908, an analog input 910, a TosLink input 912, and control ports 914 which may include RS232, IR, or other control ports. An AC/DC power supply 916 provides power to multi-role amplifier 900. Multi-role amplifier 900 provides an RCA pre-amp output 920 and may be used to drive external passive speakers 918.

Within an automation environment 100 (FIG. 1), multi-role amplifier 900 is capable of serving as both an audio amplifier and a multi-role automation host 104 (FIG. 1).

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. It is thus the object of the appended claims to cover all such variations and modifications as come within the true spirit and scope of the invention.

What is claimed is:

1. An automation control apparatus, said apparatus comprising:
   a multi-role automation host, said multi-role automation host having connectivity for communicating with a first user device, said first user device having a set of user commands to which said multi-role automation host is responsive;
   said multi-role automation host operating in a first role in which said multi-role automation host directly controls one or more profiled devices, each of said one or more profiled devices having an associated profile which is accessible by said multi-role automation host, each said associated profile including information which describes a set of device commands to which the associated profiled device is responsive;
   said multi-role automation host operating in a second role in which said multi-role automation host directly controls a first set of one or more devices each of which is certified compliant with a predetermined control protocol, and indirectly controls through a first multi-role automation hub, operating in a third role, a second set of one or more devices each of which is certified compliant with said predetermined control protocol, wherein said multi-role automation host includes an automation bridge communicating with said first multi-role automation hub using messages in a first form based on said predetermined control protocol, and converting said first form to a second form for processing by said multi-role automation host, wherein said one or more profiled devices become visible to and controllable by said first multi-role automation hub; and
   said first multi-role automation hub, operating in a fourth role, producing an on screen display (OSD) displayed on a first television coupled to said first multi-role automation hub, said OSD enabling a user to select one or more predetermined lighting scenes, select one or more television channels, and control said one or more profiled devices, and said first and second sets of one or more devices each of which is certified compliant with said predetermined control protocol.

2. The apparatus as in claim 1 wherein said OSD further provides video display management including windowing, tiling, and picture-in-picture.

UNITED STATES PATENT AND TRADEMARK OFFICE
CERTIFICATE OF CORRECTION

PATENT NO. : 12,316,473 B2  
APPLICATION NO. : 18/514261  
DATED : May 27, 2025  
INVENTOR(S) : Robert P. Madonna et al.

Page 1 of 1

It is certified that error appears in the above-identified patent and that said Letters Patent is hereby corrected as shown below:

In the Specification

Column 2, Line 11 reads:  
"end user is prevented from is effectively controlling all of the"  
Should read:  
-- end user is prevented from effectively controlling all of the --

Column 5, Line 16 reads:  
"mits an Add Bridged is Devices to Hub message 306 to"  
Should read:  
-- mits an Add Bridged Devices to Hub message 306 to --

Column 6, Line 35 reads:  
"picture among others. Details regarding hardware and is"  
Should read:  
-- picture among others. Details regarding hardware and --

Column 7, Line 11 reads:  
"automation host 716 is coupled to video is switch 714, as are"  
Should read:  
-- automation host 716 is coupled to video switch 714, as are --

Column 8, Line 37 reads:  
"coupled to is a speaker 828. In general, paired WISA speaker"  
Should read:  
-- coupled to a speaker 828. In general, paired WISA speaker --

Signed and Sealed this  
Nineteenth Day of August, 2025

Coke Morgan Stewart  
*Acting Director of the United States Patent and Trademark Office*